(No Model.)
L. MAGENHEIMER.
CHOCOLATE DIPPER.
No. 560,909. Patented May 26, 1896.
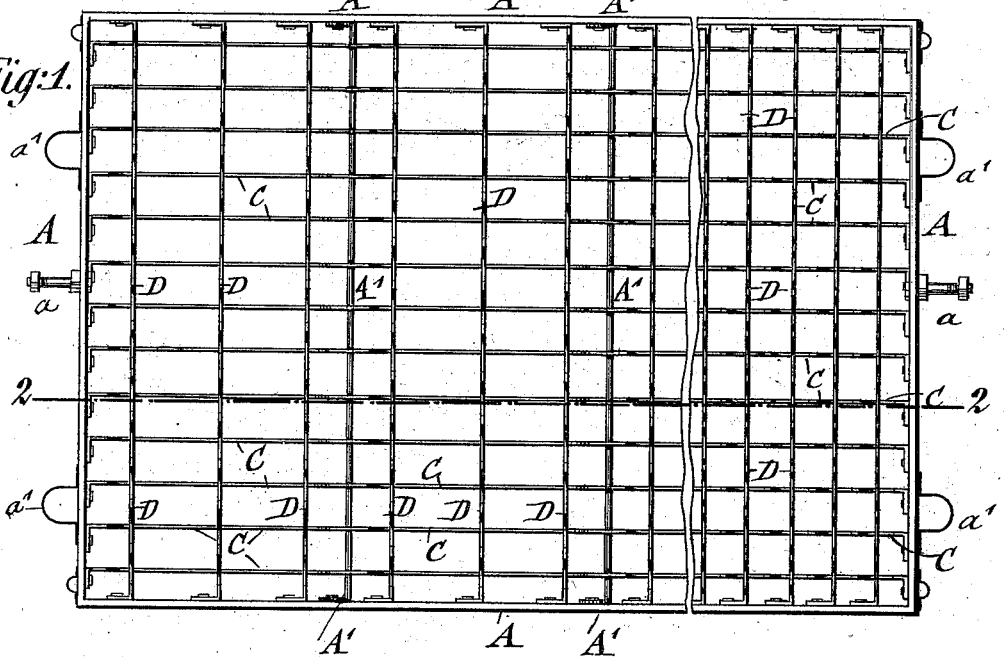
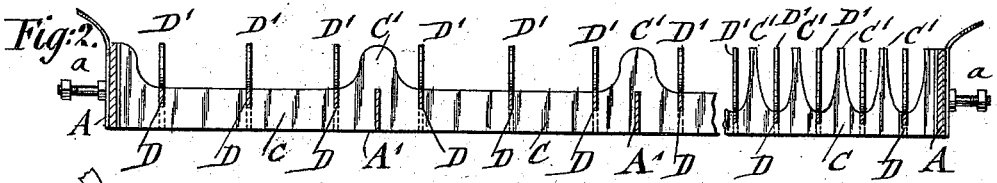
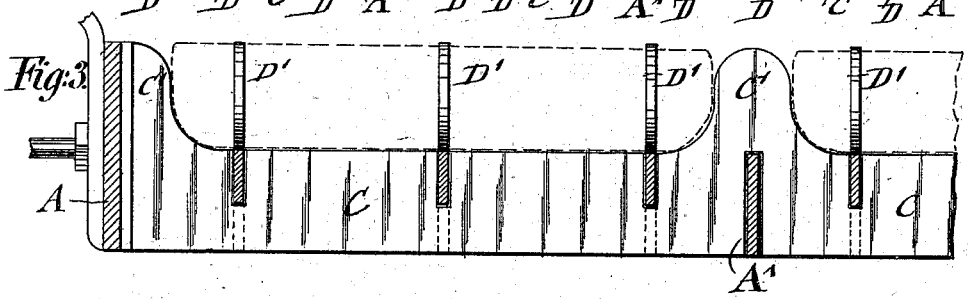
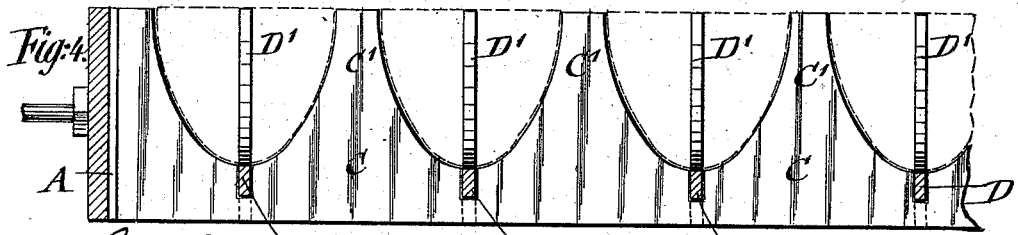
WITNESSES
INVENTOR
Louis Magenheimer
BY
ATTORNEYS

UNITED STATES PATENT OFFICE.

LOUIS MAGENHEIMER, OF BROOKLYN, NEW YORK, ASSIGNOR TO THE MASON, AU & MAGENHEIMER CONFECTIONERY MANUFACTURING COMPANY, OF SAME PLACE.

CHOCOLATE-DIPPER.

SPECIFICATION forming part of Letters Patent No. 560,909, dated May 26, 1896.

Application filed March 11, 1896. Serial No. 582,812. (No model.)

*To all whom it may concern:*

Be it known that I, LOUIS MAGENHEIMER, a citizen of the United States, residing at Brooklyn, in the State of New York, have invented certain new and useful Improvements in Chocolate-Dippers, of which the following is a specification.

This invention relates to certain improvements in chocolate-dippers or devices by which cream sticks or cream drops are submerged into hot liquid chocolate and covered with a uniform coating of chocolate; and the invention consists of a chocolate-dipper composed of an exterior supporting-frame having transverse braces and longitudinal and transverse intersecting strips which are slitted at their points of intersection and provided with tapering scallops or projections at a greater or smaller distance from each other, so that cream sticks or drops can be readily supported by the edges of the projections of the intersecting strips and then dipped in the usual manner.

In the accompanying drawings, Figure 1 represents a plan view of my improved chocolate-dipper, showing at the left-hand side the form used for sticks and on the right-hand side the form used for drops. Fig. 2 is a vertical longitudinal section on line 2 2, Fig. 1, showing likewise dippers arranged for sticks and drops. Fig. 3 is a vertical longitudinal section of a portion of the dipper shown at the left-hand side of Fig. 1, drawn on a larger scale and shown as arranged for dipping sticks; and Fig. 4 is a vertical longitudinal section of a portion of a dipper arranged for dipping cream drops.

Similar letters of reference indicate corresponding parts.

Referring to the drawings, A represents the exterior frame of my improved chocolate-dipper, which frame is preferably made of iron or steel of suitable thickness and coated with tin. The exterior frame A is provided at its opposite ends with gudgeons $a$ $a$ for permitting the easy reversing of the dipper in the supporting-frame of the dipping-machine. The exterior frame A is further provided with keepers or loops $a'$ for the lugs of the screen that is placed over the sticks or drops when they are ready to be dipped into the hot chocolate. Transverse braces A' extend from one side of the frame to the other side and are attached by their angularly-bent ends to the sides of the frame. The braces A' serve for the purpose of imparting the required degree of stiffness to a series of longitudinal metallic strips C, which are bent at their ends at right angles and riveted to the ends of the exterior frame A, said strips being provided with slits at their points of intersection with the braces A', so as to "ride" on the same and being thereby firmly supported by the same. The longitudinal metallic strips C are intersected by a series of transverse strips D, which are likewise bent at right angles at their ends and riveted to the sides of the exterior frame A, said transverse strips D, as well as the longitudinal strips C, being provided at their point of intersection with each other with short incisions or slits, so that the rigid interlocking of the longitudinal and transverse series of strips is obtained.

For the longitudinal and transverse strips C and D galvanized band-iron or steel may be used; but it is preferable to make the strips of sheet-aluminium, mainly for the sake of lightness, as thereby the weight of the dipper is considerably reduced, so that it can be easily and conveniently handled when dipping the sticks or drops placed into the same. The longitudinal and transverse strips C and D are provided at points intermediately between their points of intersection with each other with upwardly-curved tapering scallops or projections C' D', which are arranged at greater distance from each other on the longitudinal strips, so as to provide the necessary space for the length of the cream sticks to be dipped, the portion of the strips C between the upward projections or scallops being made straight, so that the cream sticks rest on the longitudinal strips and are held sidewise by the adjacent scallops of the transverse strips D, as shown clearly in dotted lines in Fig. 3. By omitting on the longitudinal strips C every second scallop C' smaller sticks can be inserted. By leaving out two adjacent scallops larger sticks can be inserted, and in this manner the dipper readily constructed for any required size or shape of sticks.

When the dipper is arranged for cream drops, the longitudinal strips C are provided with equidistant scallops or projections C' in the same manner as the transverse strips D, so that the cream drops are readily supported at four points of their circumference and in inverted position by the edges of the scallops C' D', as shown in dotted lines in Fig. 4, their center lines being in line with the intersections of the longitudinal and transverse strips C D, as shown in Fig. 4.

Practical tests of chocolate-dippers made of longitudinal and transverse aluminium strips have shown that besides the lightness of the dipper the same is as regards cleanliness far superior to the dippers heretofore in use, as not only no corroding of the parts takes place, which is an objectionable feature with the dippers heretofore in use, but the hot liquid chocolate drips off freely from the heated strips without adhering to the same or lodging at the points of intersection of the strips.

Having thus described my invention, I claim as new and desire to secure by Letters Patent—

1. A chocolate-dipper, comprising an exterior frame, transverse braces connecting said frame, a series of longitudinal metallic strips provided with slits or incisions at the points of crossing said braces, and a series of transverse metallic strips intersecting the longitudinal strips, the longitudinal and transverse strips being provided with slits at their points of intersection with each other and with upwardly-extending, tapering projections or scallops for supporting the cream sticks or drops, substantially as set forth.

2. A chocolate-dipper, consisting of an exterior frame, a series of longitudinal metallic strips bent at right angles at their ends and riveted to the frame, a series of transverse metallic strips intersecting the series of longitudinal strips and provided also with bent ends riveted to the frame, said longitudinal and transverse strips being provided with upwardly-extending tapering projections or scallops intermediately between their points of intersection, substantially as set forth.

In testimony that I claim the foregoing as my invention I have signed my name in presence of two subscribing witnesses.

LOUIS MAGENHEIMER.

Witnesses:
PAUL GOEPEL,
GEO. W. JAEKEL.